April 29, 1969     A. A. KRAUS, SR     3,441,801

ELECTRICAL DISTRIBUTION SYSTEM

Original Filed Jan. 26, 1966

United States Patent Office 3,441,801
Patented Apr. 29, 1969

3,441,801
ELECTRICAL DISTRIBUTION SYSTEM
Arthur A. Kraus, Sr., Joliet, Ill., assignor to Electronic Safety Controls Inc., Joliet, Ill., a corporation of Illinois
Continuation of application Ser. No. 523,101, Jan. 26, 1966. This application Feb. 14, 1968, Ser. No. 705,563
Int. Cl. H02h 3/00, 7/26
U.S. Cl. 317—18    13 Claims

ABSTRACT OF THE DISCLOSURE

An ungrounded electrical power supply system is described. The power supply includes an isolation transformer for converting the common ground supply to an ungrounded supply and a circuit for rendering the isolation transformer active only in the presence of a load. Means are also provided for sensing the condition of an accidental ground in the ungrounded system.

---

This application is a continuation of application Ser. No. 523,101, filed Jan. 26, 1966, and which is now abandoned.

The present invention relates generally to an electrical distribution system, and more specifically, to an electrical distribution system having an ungrounded load circuit, which finds particularly advantageous utilization in residential applications. However, it will be readily apparent that the invention is adaptable to any electrical system. The system constructed in accordance with the teachings of the present invention constitutes an improvement over the system disclosed in the copending application of the present inventor, Ser. No. 445,043, filed Apr. 2, 1965.

Many electrical devices are utilized daily which may result in electrical shocks to the users. The danger of such electrical shocks is increased in damp areas, such as basements, laundry rooms, bathrooms, kitchens or industrial areas, and such shocks may prove to be fatal to elderly people or children. Additionally, many fatalities occur each year as a result of electrical devices falling into swimming pools, bathtubs and the like. Moreover, many fires are started because of sparking between defective electrical cords of electrical devices and nearby grounded metallic objects. These problems arise because all distribution lines feeding residents and business places have one side grounded to protect against lightning and short circuit hazards.

A primary object of the present invention is to provide a new and improved electrical distribution system which eliminates the foregoing problems. More specifically, an object is to provide a new and improved electrical distribution system for a residence or business establishment having an ungrounded load circuit wherein the system is still protected against lightning and short circuit hazards. To accomplish this, isolation transformers are utilized as a main, high power transformer and as an auxiliary low power transformer and the main power transformer is "shut off" when the load requirements are low, the input of the system being grounded and the transformers isolating the load circuit from the input.

Another object is to provide such a system wherein the auxiliary power transformer supplies low power to the load circuit for electrical clocks or the like when the power requirements of the system are low. Still another object is to provide such a system wherein an auxiliary power transformer may be provided for continuously supplying low voltage power to door bells and the like.

A further object of the present invention is to provide such a system wherein means are associated with the main power transformer for independently supplying power to the load circuit under different power requirements. A still further object is to provide such a system wherein means are provided for indicating the presence of a ground in the load circuit.

A general object of the present invention is to provide a new and improved electrical distribution system which eliminates shock hazards and more particularly which allows a person in a bathtub or in a moist area to handle electrical devices without fear of shock. Another general object is to provide such a system wherein a defective electrical cord cannot spark to a grounded metallic object.

A further general object is to provide such a system wherein the cost of standby power is reduced since the main power transformer is placed across the input line only when there is sufficient external loading.

Other objects and advantages of the present invention will become apparent upon reading the attached, detailed description, taken in conjunction with the drawing.

In one form of the present invention, an electrical distribution system is provided which includes a load circuit, a source of low power and a source of high power. Means are provided for transmitting power from the low power source to the load circuit when the power requirements are low and for isolating the load circuit from the low power source. Additionally, means are provided which respond to the load circuit demand exceeding the power capabilities of the low power source for transmitting power from the high power source to the load circuit while isolating the load circuit from the high power source. The invention also resides in the provision of means for independently transmitting power from the high power source to the load circuit under different power requirements. Additionally, the invention relates to the provision of means for indicating the presence of a ground in the load circuit.

For the purpose of providing a detailed description of the present invention, reference will now be made to the drawing wherein:

FIGURE 1 is a schematic diagram of an electrical distribution system constructed in accordance with the teachings of the present invention; and FIG. 2 is a schematic diagram of means for indicating the persence of a ground in the load circuit of the system shown in FIG. 1.

While the invention has been shown and will be described in some detail with reference to a particular exemplary embodiment thereof, there is no intention that it be limited to such detail. Quite to the contrary, it is intended here to embrace all modifications, alternatives and equivalents falling within the spirit and scope of the invention as defined by the appended claims. In this connection, the invention will be described with respect to controlling the supply of single phase power, though it will be readily apparent that it may likewise be adapted to control the supply of multiphase power.

Referring now to the drawing, and more specifically, to FIG. 1, an electrical distribution system 10 is shown which is constructed in accordance with the teachings of the present invention. The system includes a main isolation transformer T1 which is provided to function as the main high power transformer and which supplies power from supply lines 11a and 11b, shown as 120 volt AC supply lines, to a load circuit LC through load lines 12a and 12b. As will be readily apparent, the load circuit LC may include a plurality of load devices disposed within a residence or business establishment, the number of load devices being limited by the transformer amperage rating. The 120 volt AC supply lines are connected to the primary winding T1a of the isolation transformer T1 through a fuse F1 and through parallelly associated, normally open contact arms K1a and K2a associated with serially related control relay energizing windings R1 and R2, the lower supply line 11b being grounded as shown. On the other hand, the load circuit LC is connected to the secondary winding T1b through the load line 12a, through the energizing winding R2, through the normally open contact arm K2b associated with the energizing winding R2, and through the load line 12b. Additionally, the load circuit LC is connected to the secondary winding T1b through the load line 12a, through the energizing winding R2, through the energizing winding R1, through the normally open contact arm K1b associated with the energizing winding R1, and through the load line 12b. In keeping with the present invention, as will become apparent, the energizing windings R1 and R2 are designed to be sufficiently energized at different current levels to cause the associated contacts to be closed.

For the purpose of supplying a low power AC signal to the load circuit LC, when the power requirements of the load circuit LC are low, an auxiliary isolation transformer T2 is provided. As may be seen, the primary winding T2a of the transformer T2 is connected across the 120 volt AC supply lines 11a and 11b. The secondary winding T2b is connected to the load circuit LC through the control relay energizing windings R1 and R2 and through the load lines 12a and 12b. Consequently, low power is supplied to the load circuit LC for operating electrical clocks and the like when the load requirements of the system are low. In the exemplary arrangement, the auxiliary transformer T2 also functions to provide a low voltage AC signal, for example, a 24 volt signal, in a secondary winding T2c for continuously supplying power to door bells and the like.

In operation of the electrical distribution system 10, power is supplied to the load circuit LC only from the secondary winding T2b of the transformer T2 when the power requirement of the load circuit is below a first prescribed level, i.e., when the current flow from the winding T2b is below a prescribed percentage of the maximum current rating thereof. During this time, current flows from the winding T2b to load circuit LC through the energizing windings R1 and R2 and the load lines 12a and 12b, the energizing windings R1 and R2 not being sufficiently energized to cause the associated contacts to be closed.

When the power requirement of the load circuit LC is equal to or exceeds the first prescribed level, the current flow through the energizing winding R1 causes the winding to be sufficiently energized (1) to cause the contact arm K1a to be moved into engagement with the associated contact K1a' so that the 120 volt AC supply lines 11a and 11b are connected across the primary winding T1a of the isolation transformer T1 and (2) to cause the contact arm K1b to be moved into engagement with the associated contact K1b' so that the load circuit LC is connected across the secondary winding T1b of the isolation transformer T1 through the energizing windings R1 and R2, through the contact arm K1b and the associated contact K1b' and through the load lines 12a and 12b. In keeping with the present invention, the control relay employing the energizing winding R1 is designed to control the flow of current from the secondary winding T1b to the load circuit LC when the power requirement thereof is between the first prescribed level and a second prescribed level.

When the power requirement of the load circuit LC is equal to or exceeds the second prescribed level, the current flow through the energizing winding R2 causes the winding to be sufficiently energized (1) to cause the contact arm K2a to be moved into engagement with the associated contact K2a' so that the 120 volt AC supply lines 11a and 11b are maintained across the primary winding T1a of the isolation transformer T1 and (2) to cause the contact arm K2b to be moved into engagement with the associated contact K2b' so that the load circuit LC is connected across the secondary winding T1b of the isolation transformer T1 through the winding R2, through the contact arm K2b and the contact K2b', and through the load lines 12a and 12b. At this time, the energizing winding R1 is bypassed and shortcircuited by the contact arm K2b and the winding R1 is deenergized so that the contact arms K1a and K1b are opened.

In a typical operation of the disclosed system, the auxiliary transformer T2 may be selected to supply 0–1 amp in the secondary winding T2b and the main transformer T1 may be selected to supply 0–50 amps in the secondary winding T1b. The relay employing energizing winding R1 may have an operating range of .8–10 amps and the relay employing energizing winding R2 may have an operating range of 8–50 amps. Under these conditions, when the power requirements of the load circuit LC are such that less than .8 amp flows through the energizing windings R1 and R2, the current is supplied only from the secondary winding T2b. On the other hand, when the power requirements are such that the current flow is equal to or exceeds .8 amp but is less than 8 amps, the winding R1 is sufficiently energized so that current is supplied to the load circuit from the secondary winding T1b and is conttrolled by the relay employing winding R1. Finally, when the power requirements are such that the current flow is equal to or exceeds 8 amps, the winding R2 is sufficiently energized so that current continues to be supplied to the load circuit from the secondary winding R2 and is controlled by the relay employing winding R2.

While the exemplary electrical distribution system employs the two control relays employing windings R1 and R2 for controlling the flow of current to the load circuit at different levels, it will be readily apparent that the system may be modified to utilize only a single relay. Under these conditions, the relay would be selected to control the flow of current to the load circuit LC when the current flow thereto equaled or exceeded the first prescribed level. Consequently, the present invention is intended to cover the utilization of one or more control relays for independently controlling the flow of current to the load circuit LC at different load levels.

In view of the foregoing, it will be seen that a new and improved electrical distribution system has been provided which associates the load circuit with a low power supply when the power demand is below a prescribed level and associates the load circuit with a high power supply when the demand exceeds the prescribed level. Additionally, it will be seen that the exemplary system employs relay circuitry having different operating levels for controlling the flow of current to the load circuit to allow for a wider range of power capabilities for the system. In this connection, relay circuits are employed for indepedently controlling the flow of current to the load circuit when the load circuit power demand is within different ranges. Moreover, it will be seen that the load lines of the system are isolated from the grounded input supply. Since the load lines are not grounded, the source of electrical shocks to users is eliminated. Additionally, the source for sparking between the defective electrical cord and grounded metallic devices is likewise eliminated. Further, it will be apparent that the standby power drawn by the disclosed distribution system is substantially below that of a system wherein the main power transformer is continuously across the supply lines since, in the disclosed system, only a small isolation transformer, utilized for providing auxiliary and control power, is continuously across the supply lines.

Referring now to FIG. 2 an indicator circuit 20 is shown which is adapted to be inserted within the load lines 12a of FIG. 1 and which will function to indicate the presence of a ground in the isolated secondary of the distribution system 10. When a ground is not present in the isolated secondary of the system, a green signal light SL1 is energized. On the other hand, when a ground is present in the isolated secondary of the system, a red signal light SL2 is energized and the doorbell circuit is energized.

The indicator circuit 20 includes the series arrangement of an energizing winding R3 of a control relay and a control capacitor C1. As may be seen, one side of the series arrangement is grounded and the other side is respectively connected to the load lines 12a and 12b through the series arrangement of a diode D1 and a resistor RES1 and through the series arrangement of a diode D2 and a resistor RES2. Additionally, a discharge resistor RES3 is connected in parallel with the capacitor C1 and a switch S1 is provided to allow for rendering the indicator circuit 20 inoperative.

When a ground is not present in the isolated secondary, the relay winding R3 is deenergized so that the associated contact K3 is in engagement with a contact terminal K3a. Under such conditions, the green signal light SL1 is connected across the secondary winding T2c of the isolation transformer T2. On the other hand, when a ground is present in the isolated secondary, a circuit is completed through the relay winding R3 and the capacitor C1 causing the relay winding to be energized. This latter circuit is completed from the grounded load line 12a or 12b, through the secondary winding T1b, and through the series arrangement, including the diode D1 and the resistor RES1 or the diode D2 and the resistor RES2, associated with the other, ungrounded load line. Under these conditions, a charge is attained on the capacitor C1 and the contact arm K3 is drawn into engagement with the contact terminal K3b. Accordingly, the red signal light SL2 is connected across the secondary winding T2c of the isolation transformer T2 and is energized and the doorbell or another desired audible signaling device (not shown) is connected in parallel with the red signal light so that it likewise is connected across the secondary winding T2c of the isolation transformer T2 and is energized. When the charge on the capacitor C1 attains a prescribed level, it will be apparent that the current flow will be insufficient to maintain the relay winding R3 energized and the indicator circuit will be rendered inoperative so that the green light SL1 is again energized. Thus, the period of operation of the indicator circuit is controlled by the charging period of the capacitor C1. In the event it is not desired to have the indicator circuit automatically drop out after a prescribed time period, the capacitor C1 and the resistor RES3 may be eliminated. When the ground no longer exists or when the switch S1 is open, it will be apparent that the capacitor C1 will discharge through the resistor RES3.

In view of the foregoing, it will be seen that an indicator circuit has been provided for indicating the presence of a ground within the isolated secondary of the electrical distribution system. If the components of the indicator circuit 20 are properly selected, it will be apparent that the current flow therein will be too low to shock a user who may inadvertently engage one of the load lines 12a and 12b. In a typical application the values of the components in the indicator circuit 20 may be as follows:

| | | |
|---|---|---|
| RES1 and RES2 | ohms | 147,000 |
| R3 | do | 25,000 |
| C1 (50 v. DC) | mfd | 100 |
| RES3 | ohms | 27,000 |

What is claimed is:

1. In an electrical distribution system, the combination which comprises a load circuit, a source of low power, a source of high power, means for transmitting power from the low power source to the load circuit when the power requirements are below a prescribed level and for isolating the load circuit from the low power source, and means responsive to the load circuit demand being at least equal to the prescribed level for transmitting power from the high power source to the load circuit while isolating the load circuit from the high power source.

2. The system as recited in claim 1 wherein the transmitting means include isolation transformers.

3. The system as recited in claim 1 wherein the responsive means includes a relay circuit which responds to the flow of current therethrough.

4. The system as recited in claim 1 wherein the responsive means includes a pair of relays having their coils serially related which function at different current levels to cause power to be transmitted from the high power source to the load circuit.

5. The system as recited in claim 4 wherein the coils are connected in series with the load circuit and the relays are energized responsive to different levels of current flow through the coils to cause power to be transmitted from the high power source to the load circuit.

6. The system as recited in claim 5 wherein one of the relays function to cause current to flow to the load circuit through both relay coils, wherein bypass means are associated with the coil of the one relay, and wherein the other relay functions to cause current to flow to the load circuit through the bypass means and the coils of the other relay.

7. The system as recited in claim 1 wherein means are provided for indicating the presence of a ground in the load circuit.

8. In an electrical distribution system the combination which comprises a load circuit, a source of power, first means operable to transmit power from the source to the load circuit when the load circuit power demand is within a first range while isolating the load circuit from the source, and second means operable to transmit power from the source to the load circuit when the load circuit power demand is within a second range while isolating the load circuit from the source.

9. The system as recited in claim 8 wherein the means each includes a relay which is energized at a different level of current flow to cause power to be transmitted to the load circuit.

10. The system as recited in claim 9 wherein the coils of the relays are connected in series, wherein the first means functions to cause current to flow to the load circuit through both relay coils, and wherein the second means includes a bypass circuit for the relay coil of the first means and functions to cause current to flow to the load circuit through only the relay coil of the second means.

11. In combination, an ungrounded source of electrical energy, a relay operated switch, means forming a path connecting said relay operated switch between said source and a ground point and for causing current to flow in said path when a point in said ungrounded source becomes grounded, said means including a resistor and capacitor connecting a parallel, the parallel combination being connected in series with said relay and wherein said source includes at least two points of differing potential, each coupled to said relay through a diode.

12. The combination of claim 11 further including two indicator lamps and wherein said relay operated switch causes one of said lamps to be energized by said source when said relay is energized and the other of said lamps to be energized when said relay is unenergized.

13. The combination of claim 12 wherein said source includes a low power source and a high power source and further including a load circuit, means for transmitting power from the low power source to the load circuit when the power requirements are below a prescribed level and for isolating the load circuit from the low power source, and means responsive to the load circuit demand being at least equal to the prescribed level for transmitting power from the high power source to the load circuit while isolaing the load circuit from the high power source.

References Cited

UNITED STATES PATENTS

| | | | |
|---|---|---|---|
| 2,114,687 | 4/1938 | Schmitt | 317—18 X |
| 3,168,682 | 2/1965 | Moore et al. | 317—18 |
| 3,229,163 | 1/1966 | Rogers | 317—18 |
| 3,242,382 | 3/1966 | Rogers | 317—18 |
| 3,253,188 | 5/1966 | Nissel | 317—18 X |
| 3,319,122 | 5/1967 | Marino | 317—27 X |
| 3,335,324 | 8/1967 | Buckeridge | 317—18 |

JOHN F. COUCH, *Primary Examiner.*

R. V. LUPO, *Assistant Examiner.*

U.S. Cl. X.R.

317—27; 340—248